United States Patent [19]

Schneider

[11] 3,772,462

[45] Nov. 13, 1973

[54] METHOD AND APPARATUS FOR DETECTING ACHROMATIC PORTIONS IN A COLOR TELEVISION IMAGE

[75] Inventor: Hans-Dieter Schneider, Gross-Gerau, Germany

[73] Assignee: Fernseh GMBH, Darmstadt, Germany

[22] Filed: May 17, 1972

[21] Appl. No.: 254,163

[30] Foreign Application Priority Data

May 19, 1971 Germany .................. P 21 24 959.2

[52] U.S. Cl. .......................................... 178/5.4 BT

[51] Int. Cl. .......................................... H04n 9/04

[58] Field of Search ..................... 178/5.4 R, 5.4 M, 178/5.4 BT, 5.4 HE

[56] References Cited

UNITED STATES PATENTS

| | | | |
|---|---|---|---|
| 3,627,911 | 12/1971 | Kubota et al. | 178/5.4 R |
| 3,700,790 | 10/1972 | Ryley | 178/5.4 M |

*Primary Examiner*—Robert L. Richardson
*Attorney*—Revere B. Gurley et al.

[57] ABSTRACT

Detecting achromatic portions of a color television signal. A luminance signal is compared with each of two chrominance signals to generate two difference signals. When both difference signals are above zero, they are time averaged and threshold detected to generate a signal for use in prior art regulation.

12 Claims, 1 Drawing Figure

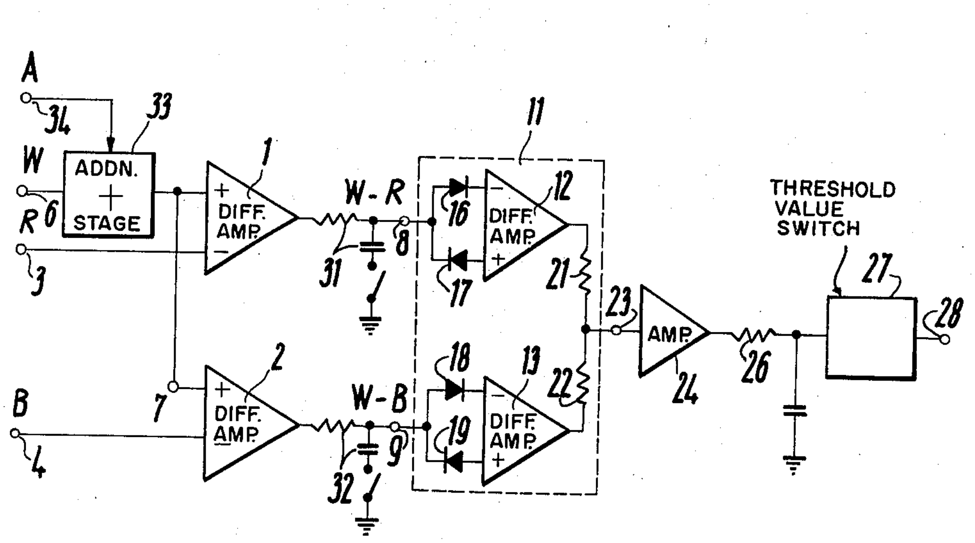
Inventor:
Hans-Dieter Schneider

METHOD AND APPARATUS FOR DETECTING ACHROMATIC PORTIONS IN A COLOR TELEVISION IMAGE

BACKGROUND OF THE INVENTION

The invention relates to a method for detecting the achromatic portions in signals corresponding to a color television image and produced by a color image transmitter, especially a television camera, and an apparatus for carrying out this method.

For faultless operation of devices for automatic adjustment and keeping constant of the scanned portion coincidence in television pick-up tubes in the various color channels, or of the color balance and similar self-adjusting systems in color image transmitters, especially television cameras, it is required that an achromatic or chromatically neutral pattern be scanned. This is so because a fully satisfactory adjustment or correction of the operational values to be adjusted takes place only when the signal bursts to be utilized occur simultaneously in all three color channels. Such devices ought therefore to be switched on only when this condition is fulfilled. In the case of manual correction, e.g., of scanning pattern coincidence, the condition is positively fulfilled by using as a criterion only an image pattern especially produced for this purpose. This however, entails a substantial restriction in the employment of such automatic regulating systems in practical operation.

SUMMARY OF THE INVENTION

The invention proposes a method and a device for detecting achromatic portions in a television image, in which the aforementioned disadvantages are avoided.

According to the invention, in the process initially mentioned, two signals with the difference between the luminance signal and a chrominance value signal in each case are produced, each of which is fed to the input of a gate constructed in such a way that at its output no signal (or in an alternative embodiment a signal) appears only when, within a prespecified tolerance range the differential signals equal zero, and a signal (or in the alternative embodiment no signal) appears when both the differential signals are larger than zero.

The method of the invention has the advantage that it also operates faultlessly with any image patterns and can be carried out during the normal operation of the color-image transmitter, that is to say, also during the transmission.

Suitably the signal originating at the output of the gate is integrated, and the integrated signal is fed to a threshold-value switch. Thereby the signal path for regulation is automatically cleared only when a prespecified minimum area portion of the image pattern is achromatic.

Furthermore, it is advantageous to eliminate the effect of the blanking potential in the luminance signal by suitable scanning pulses. Thereby an increase in accuracy between color and chromatically neutral signals can be achieved. This is so because, by a shifting of the blanking signal from the black-level value to the bright-level value in the luminance signal, the chromatically neutral blanking intervals are prevented from entering the summation as achromatic portions.

BRIEF DESCRIPTION OF THE DRAWING

The invention will now be explained in greater detail by means of an embodiment shown in the figure in which only the parts necessary for the understanding of the invention are drawn.

DESCRIPTION OF THE PREFERRED EMBODIMENT

The color-value signals red (R) or blue (B), produced by the color-image transmitter, are fed to two differential amplifiers 1 and 2, respectively, via input terminals 3 and 4, respectively, of these amplifiers. The luminance signal (W) produced also by the color-image transmitter is fed to the two differential amplifiers 1 and 2, respectively, via terminals 6 and 7, respectively, of said amplifiers. "Luminance signal" means the luminous density signal, or the green signal, or, alternatively, the white signal located in the spectral distribution between the said two signals.

The differential signals W-R or W-B produced at the output of differential amplifier 1 or 2 are fed to inputs 8 and 9, respectively, of a gate 11. Gate 11 consists of two further differential amplifiers 12 and 13 to whose inputs in each case two diodes 16, 17 and 18, 19 of opposite polarity are respectively connected, in which structure the diodes are connected at the side facing away from the differential amplifiers and are connected to input terminals 8 and 9, respectively. The output of each differential amplifier 12 or 13 is connected to an output terminal 23 of gate 11 via a resistor 21 and 22, respectively. From this structure of gate 11 a gated signal can be taken off at the output 23 thereof only when, within a prespecified tolerance range, difference signals W-R and W-B are both greater than zero. No signal can be taken off when the differential signals equal zero.

Output 23 of gate 11 is connected via an amplifier stage 24 to an integrating element 26, whereby, e.g., all signals produced at the output of gate 11 are integrated as capacitor charge to derive a time-averaged value. This integral signal is then fed to a threshold value switch 27, whereby an automatic regulating process is unblocked via terminal 28 when the threshold value is exceeded and blocked when the threshold value is not reached.

In the employment of such an apparatus in systems for automatic scanning pattern correction, it may be advantageous to lower the limiting frequency of the color signal to be detected, preferably by providing disconnectable low-pass filters 31 and 32, respectively, between differential amplifiers 1 or 2 and gate 11, whereby then only video signals below a prespecified frequency are scanned. This reduction of the bandwidth is advantageous particularly in cases that involve the correction of very large scanning-pattern coincidence errors, since a coincidence error exceeding a specific value is detected by the apparatus of the invention as color signal even when the signals are produced by an achromatic pattern. This low-pass filter 31 or 32 can be switched off when larger scanning-pattern errors are eliminated and only fine corrections remain to be made which can be carried out, e.g., during the operation.

Between the output of the image transmitter for the luminance signal (W) and the corresponding inputs of the differential amplifiers 1 or 2, an addition stage 33 is provided, in which a pulse supplied via a terminal 34 to the luminance signal is introduced into the luminance signal. This pulse shifts the blanking signal from the black-level value to the bright-level value, whereby the accuracy of recognition in differentiating between color and chromatically netural signals can be further increased.

I claim:

1. A method for detecting achromatic portions in color television signals including a luminance signal W, a first chromatic signal R and a second chromatic signal B, comprising the steps of:

A. producing a first difference signal W-R by comparison of the luminance signal and the first chromatic signal, B. producing a second difference signal W-B by comparison of the luminance signal and the second chromatic signal, C. producing a single gated signal when and only when the first and the second difference signal are both above zero by a predetermined tolerance range, and D. deriving a regulation signal from said gated signal.

2. A method according to claim 1 wherein the step of deriving the regulation signal comprises integrating the gated signal to derive a time-averaged value signal therefrom.

3. A method according to claim 2 further comprising the step of comparing the time-averaged value signal with a predetermined threshold value to generate said regulating signal only when the time-averaged value signal exceeds the threshold value.

4. A method according to claim 1 comprising the further steps of

A. eliminating those portions of the first difference signal above a predetermined frequency to derive a frequency-limited first difference signal, and B. eliminating those portions of the second difference signal above a predetermined frequency to derive a frequency-limited second difference signal, and wherein C. the step of producing the gated signal is based upon the frequency limited versions of the first and second difference signals.

5. The method of claim 1 comprising the further step of adding a scanning pulse to the luminance signal before producing the difference signals, thereby eliminating the influence of a blanking signal present in the luminance signal.

6. Apparatus for detecting achromatic portions in color television signals including a luminance signal W, a first chromatic signal R and a second chromatic signal B, comprising:

A. first comparison means for producing a first difference signal W-R by comparison of the luminance signal and the first chromatic signal, B. second comparison means for producing a second difference signal W-B by comparison of the luminance signal and the second chromatic signal, C. gate means responsive to the first and second difference signals for producing a gated signal when and only when the first and the second difference signals are both above zero by a predetermined tolerance range, and D. output means for deriving a regulation signal from said gated signal.

7. Apparatus according to claim 6 wherein the gate means comprises first and second differential amplifiers, each amplifier having two inputs respectively connected to each of two diodes of opposite polarities, the two diodes of each amplifier being connected together on the sides away from the amplifier inputs to form a diode junction, and the diode junctions of the first and second amplifiers being connected respectively to receive the first and second difference signals, the outputs of the first and second differential amplifiers being connected through first and second summing resistors to form an output junction, said gated signal appearing at said output junction.

8. Apparatus according to claim 7 further comprising an integrating means connected to receive the gated signal from the output junction to derive a time-averaged signal therefrom.

9. Apparatus according to claim 8 further comprising threshold switch means responsive to the time-averaged signal for generating said regulating signal only when the time-averaged value signal exceeds a predetermined value.

10. Apparatus according to claim 8 further comprising low-pass filter means for filtering the first and second difference signals before application to the gate means.

11. Apparatus according to claim 10 wherein said low-pass filter means is disconnectable.

12. Apparatus according to claim 6 further comprising addition means for adding a scanning pulse to the luminance signal before producing the difference signals, thereby eliminating the influence of a blanking signal present in the luminance signal.

* * * * *